United States Patent
Tseng et al.

(10) Patent No.: US 9,845,048 B1
(45) Date of Patent: Dec. 19, 2017

(54) CAR DOOR OPENING PRE-DETECTION SYSTEM

(71) Applicant: PRIMAX ELECTRONICS LTD., Taipei (TW)

(72) Inventors: Ying-Che Tseng, Taipei (TW); Tung-Heng Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 15/371,775

(22) Filed: Dec. 7, 2016

(30) Foreign Application Priority Data

Oct. 28, 2016 (TW) .............................. 105135084 A

(51) Int. Cl.
| | | |
|---|---|---|
| *B60Q 1/26* | (2006.01) | |
| *B60Q 1/50* | (2006.01) | |
| *B60Q 1/40* | (2006.01) | |
| *B60Q 1/34* | (2006.01) | |
| *B60Q 1/00* | (2006.01) | |
| *G08B 21/00* | (2006.01) | |
| *G08G 1/01* | (2006.01) | |
| *G07C 9/00* | (2006.01) | |

(52) U.S. Cl.
CPC ........... *B60Q 1/50* (2013.01); *G07C 9/00896* (2013.01); *G08G 1/01* (2013.01)

(58) Field of Classification Search
None
See application file for complete search history.

(56) References Cited

U.S. PATENT DOCUMENTS

| | | | | |
|---|---|---|---|---|
| 4,864,298 A | * | 9/1989 | Dombrowski | B60Q 9/008 180/169 |
| 5,121,098 A | * | 6/1992 | Chen | B60Q 1/2696 307/10.1 |
| 5,160,914 A | * | 11/1992 | Sato | B60R 25/1003 340/426.17 |
| 5,682,135 A | * | 10/1997 | Labonde | G07C 9/00309 180/287 |
| 5,828,299 A | * | 10/1998 | Chen | B60Q 1/0076 180/287 |
| 5,936,317 A | * | 8/1999 | Sasanouchi | H02J 7/0031 307/10.1 |
| 6,134,692 A | * | 10/2000 | Sekiya | G06K 7/10029 340/10.42 |

(Continued)

*Primary Examiner* — Steven Lim
*Assistant Examiner* — Muhammad Adnan
(74) *Attorney, Agent, or Firm* — Kirton McConkie; Evan R. Witt

(57) ABSTRACT

A car door opening pre-detection system for a car includes a first detecting module, a second detecting module and a control module. The first detecting module is installed within the car. The first detecting module issues a motion detecting signal according to a result of detecting a motion of a palm. The second detecting module is installed outside the car. When the car is stopped, the second detecting module is enabled to selectively provide a first detection range or a second detection range. The control unit judges whether a car door of the car is about to be opened according to the motion detecting signal. When the car is stopped and the control module judges that the car door is about to be opened, the second detecting module provides the second detection range to detect whether there is a moving object behind the car.

15 Claims, 6 Drawing Sheets

(56) References Cited

U.S. PATENT DOCUMENTS

| | | | | |
|---|---|---|---|---|
| 6,583,734 B2* | 6/2003 | Bates | ............... | G08G 1/20 |
| | | | | 340/905 |
| 6,876,294 B1* | 4/2005 | Regan | ............... | G06K 7/0008 |
| | | | | 340/10.1 |
| 8,370,021 B2* | 2/2013 | Okada | ............... | B60R 1/12 |
| | | | | 340/436 |
| 8,938,337 B2* | 1/2015 | Nakakura | ............... | E05C 17/00 |
| | | | | 340/426.24 |
| 9,514,629 B2* | 12/2016 | Chen | ............... | B60Q 9/008 |
| 2004/0114384 A1* | 6/2004 | Carter | ............... | B60Q 1/2665 |
| | | | | 362/494 |
| 2005/0231337 A1* | 10/2005 | Tourneur | ............... | B60Q 9/00 |
| | | | | 340/426.28 |
| 2009/0086496 A1* | 4/2009 | Todani | ............... | B60Q 1/10 |
| | | | | 362/465 |
| 2011/0260848 A1* | 10/2011 | Rodriguez Barros | ............... | B60Q 1/2665 |
| | | | | 340/438 |
| 2012/0065858 A1* | 3/2012 | Nickolaou | ............... | B60Q 9/008 |
| | | | | 701/70 |
| 2012/0194356 A1* | 8/2012 | Haines | ............... | G08G 1/161 |
| | | | | 340/933 |
| 2012/0236319 A1* | 9/2012 | Gotou | ............... | G01S 7/497 |
| | | | | 356/614 |
| 2013/0116859 A1* | 5/2013 | Ihlenburg | ............... | G06F 17/00 |
| | | | | 701/2 |
| 2014/0098230 A1* | 4/2014 | Baur | ............... | B60R 16/0232 |
| | | | | 348/148 |
| 2014/0118130 A1* | 5/2014 | Chang | ............... | G08G 1/163 |
| | | | | 340/435 |
| 2017/0028907 A1* | 2/2017 | Chen | ............... | B60Q 1/323 |

\* cited by examiner

CAR DOOR OPENING PRE-DETECTION SYSTEM

FIELD OF THE INVENTION

The present invention relates to a driving safety auxiliary system, and more particularly to a car door opening pre-detection system and an operating method thereof.

BACKGROUND OF THE INVENTION

As known, the traffic is very dangerous. In recent years, many car accidents are caused by the car drivers or passengers who were unaware of the cars from the rear side. For example, 3,558 cases have occurred in 2015 alone, resulting 5 deaths and 3,800 injuries. For reducing the occurrence of similar traffic accidents, the Legislative Yuan (i.e., a legislature of Taiwan) has passed the preliminary examination of Road Traffic Management and Penalty Act in 2016. According to the preliminary examination, if the car driver or passengers results in a traffic accident because of not taking the right way to open doors, the car driver shall be fined NT 1,200 to 3,600.

The establishment of penalties can help reduce the occurrence of similar traffic accidents. However, these traffic accidents still fail to be completely avoided. Moreover, since the right way to open and close the door is very subjective, it is usually very difficult to find out the responsibility of the accident attribution. In order to improve traffic safety of the people using the roads, many car door opening anti-collision/warning systems have been continuously developed.

For example, a car door opening warning system with a detecting module and a locking mechanism is disclosed in Taiwanese Patent No. M491598; a car door opening safety warning and monitoring device with a left side image capture module and a right side image capture module is disclosed in Taiwanese Patent No. M521009; and a car door opening anti-collision device with a door damper is disclosed in Taiwanese Patent No. M521009.

The conventional car door opening anti-collision/warning system, however, still has some drawbacks. For example, the conventional car door opening anti-collision/warning system only has a single detection range. Consequently, the possibility of causing erroneous judgment or erroneous operations upon detection is increased. Moreover, in Taiwanese Patent No. M521009, an additional damper module has to be additionally installed in the car door to provide the anti-collision function. If the car door is repeatedly opened and closed for a long time, the damper module is possibly abraded because of the frequent use. Since the damper module loses its original function, the risk of causing collision of the car door increases. Moreover, the additional damper module is detrimental to the structure of the car body and increases the cost. Consequently, the anti-collision system is not favored by many users.

Therefore, there is a need of providing a car door opening pre-detection system for effectively achieving the anti-collision function without installing an additional component on the exterior portion of the car body.

SUMMARY OF THE INVENTION

An object of the present invention provides car door opening pre-detection system. By the car door opening pre-detection system of the present invention, the driver or passenger can pre-detect the traffic condition behind the car and immediate control the opened or locked state of the car door before the car door is opened. Moreover, according to a warning signal or a scene image behind the car, the car door opening pre-detection system realizes that a moving object behind the car is approaching. Moreover, the car door opening pre-detection system provides another warning signal to warn other cars or pedestrians behind the car.

In accordance with an aspect of the present invention, there is provided a car door opening pre-detection system for a car. The car door opening pre-detection system includes a first detecting module, a second detecting module and a control module. The first detecting module is installed in an interior portion of the car. The first detecting module issues a motion detecting signal according to a result of detecting a motion of a palm. The second detecting module is installed on an exterior portion of the car. When the car is stopped, the second detecting module is enabled to selectively provide a first detection range or a second detection range. The control module is electrically connected with the first detecting module and the second detecting module. The control unit receives the motion detecting signal and judges whether a car door of the car is about to be opened according to the motion detecting signal. When the car is stopped and the control module judges that the car door is about to be opened, the first detection range of the second detecting module is switched to the second detection range under control of the control module, and the second detecting module provides the second detection range to detect whether there is a moving object behind the car.

In an embodiment, the first detecting module is an optical detecting module or a pneumatic/micro-vibration detecting module.

In an embodiment, the first detecting module is installed on a steering wheel of the car or installed on a door handle in the interior portion of the car.

In an embodiment, if the first detecting module detects that a distance between the palm and the door handle is within a predetermined distance, the control module judges that the car door is about to be opened.

In an embodiment, the predetermined distance is 2 centimeters.

In an embodiment, if the first detecting module detects that door handle is touched by the palm, the control module judges that the car door is about to be opened.

In an embodiment, the second detecting module is a radar detecting module or a lidar detecting module.

In an embodiment, when the second detecting module provides the first detection range, a detecting angle is 130 degrees and a detecting distance is between 50 and 100 meters.

In an embodiment, when the second detecting module provides the second detection range, a detecting angle is 160 degrees and a detecting distance is 5 meters.

In an embodiment, the car door opening pre-detection system further includes a projecting module. The projecting module is electrically connected with the control module and projects an image.

In an embodiment, the projecting module is installed on the exterior portion of the car, and the projecting module projects the image on a road behind the car, wherein the image is a warning signal.

In an embodiment, the projecting module is installed on the interior portion of the car, and the projecting module projects the image on any door window of the car, wherein the image is a warning signal.

In an embodiment, the car door opening pre-detection system further includes an image pickup module. The image pickup module is electrically connected with the control module. The image pickup module captures a scene image behind the car. The scene image is projected on any door window of the car through the projecting module.

In an embodiment, if the second detecting module provides the second detection range and the moving object is detected by the second detecting module, the control module locks the car door for a predetermined time period.

In an embodiment, the predetermined time period is between 20 seconds and 200 seconds.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
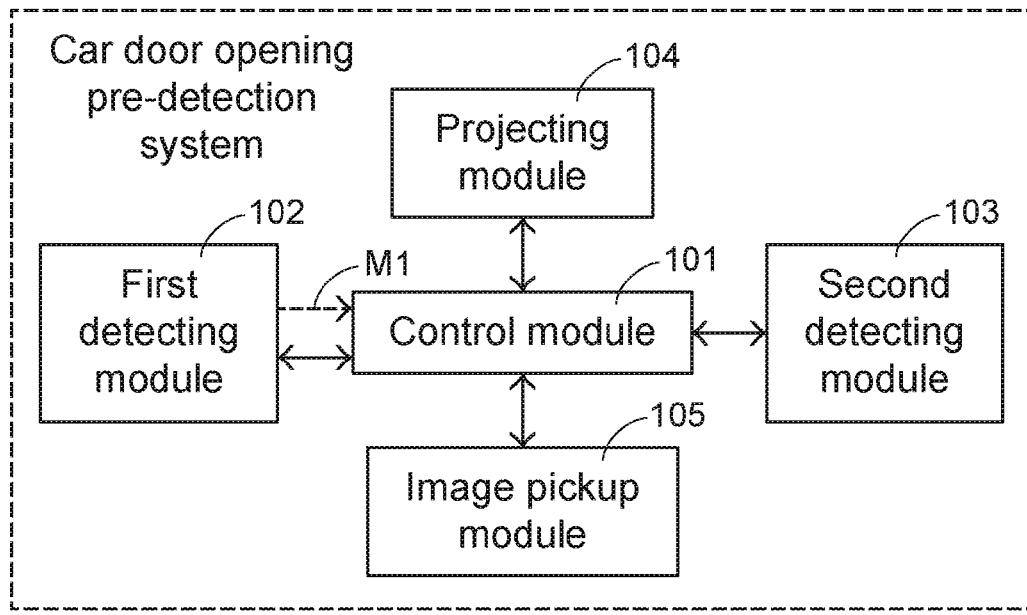
FIG. 1 is a schematic functional block diagram illustrating the architecture of a car door opening pre-detection system according to an embodiment of the present invention.

FIG. 1 is a schematic functional block diagram illustrating the architecture of a car door opening pre-detection system according to an embodiment of the present invention. As shown in FIG. 1, the car door opening pre-detection system 10 comprises a control module 101, a first detecting module 102, a second detecting module 103, a projecting module 104 and an image pickup module 105. The control module 101 is electrically connected with the first detecting module 102, the second detecting module 103, the projecting module 104 and the image pickup module 105. The second detecting module 103 provides two or more than two detection ranges. The first detecting module 102 issues a motion detecting signal M1 to the control module 101. According to the motion detecting signal M1, the control module 101 controls the operation of the second detecting module 103. Moreover, the control module 101 is electrically connected with a central control system of a car or used as the central control system of the car. Consequently, all doors of the car can be opened or locked under control of the control module 101.

The space of the car for accommodating the seats of the car is referred as an interior portion of the car. The housing of the car that is contacted with the surrounding is referred as an exterior portion of the car. In an embodiment, the first detecting module 102 is disposed within the interior portion of the car. The first detecting module 102 is usually installed on a steering wheel or a door handle within the car. The first detecting module 102 is used for detecting the motions of the palms or hands of the driver and/or passengers and issuing the motion detecting signal M1 to the control module 101 according to the result of detecting the motions of the palms or hands. An example of the first detecting module 102 includes but is not limited to an optical detecting module or a pneumatic/micro-vibration detecting module. For example, the optical detecting module is an infrared detecting module, an image detecting module or any other non-contact type detecting device. The optical detecting module is used for detecting the motions of the palms or hands of the driver and/or passengers. In case that the first detecting module 102 is an optical detecting module and installed on the door handle, the optical detecting module is used for detecting the size of an object and a motion of the object, converting the size and the motion of the object into the motion detecting signal M1 and issuing the motion detecting signal M1 to the control module 101. According to the received motion detecting signal M1, the control module 101 judges whether the object near the door handle is the elbow or the palm of the driver or passenger, thereby judging whether the car door is about to be opened. By this design, the possibility of causing erroneous detecting results is minimized when the elbow or non-palm site is close to the door handle. For example, if the elbow of the driver or passenger is close to the door handle when the car is stopped, the optical detecting module at the door handle detects that the elbow is close to the door handle and issues the motion detecting signal M1 to the control module 101. Since the size of the elbow is different from the size of the palm, the control module 101 judges that the car door is not about to be opened by the driver or passenger according to the motion detecting signal M1. Under this circumstance, the control module 101 does not need to control the operation of the second detecting module 103. Whereas, if the optical detecting module at the door handle detects that the palm of the driver or passenger is close to the door handle and the relative distance is smaller than 2 centimeters, the control module 101 judges that the car door is about to be opened by the driver or passenger according to the motion detecting signal M1. Under this circumstance, the control module 101 further controls the operation of the second detecting module 103.

Generally, the pneumatic/micro-vibration detecting module is a contact-type detecting module. In case that the first detecting module 102 is the pneumatic/micro-vibration detecting module, the pneumatic/micro-vibration detecting module is installed on the steering wheel or the door handle. When the pneumatic/micro-vibration detecting module at the steering wheel detects that the palm of the drive is separated from the steering wheel or the pneumatic/micro-vibration detecting module at the door handle is touched by the palm of the passenger, the first detecting module 102 issues the motion detecting signal M1 to the control module 101. According to the motion detecting signal M1, the control module 101 judges that the car door is about to be opened by the driver or passenger. Under this circumstance, the control module 101 further controls the operation of the second detecting module 103.

The second detecting module 103 is installed on the exterior portion of the car. For example, the second detecting module 103 is installed on a rear bumper or a rear trunk of the car. When the car is stopped, the second detecting module 103 detects whether any obstacle or other moving body is located behind the car. An example of the second detecting module 103 includes but is not limited to a radar detecting module or a lidar detecting module. The second detecting module 103 provides two or more than two detection ranges. By adjusting the output power of the second detecting module 103, the detection range of the second detecting module 103 is correspondingly changed. It is noted that the way of changing of the detection range is not restricted to the power adjustment. For example, in another embodiment, the second detecting module 103 is equipped with at least two detecting units. By switching between the at least two detecting units, the detection range of the second detecting module 103 is correspondingly changed. In an embodiment, the second detecting module 103 has two detection ranges, including a first detection range and a second detection range. When the second detecting module 103 is operated to provide the first detection range, the detecting angle is 130 degrees and the detecting distance is between 50 and 100 meters. The first detection range of the second detecting module 103 is employed to detect the farther obstacle behind the car when the car is stopped or the car is reversed. When the second detecting module 103 is operated to provide the second detection range, the detecting angle is 160 degrees and the detecting distance is 5 meters. When the car is stopped and the car door is about to be opened, the second detection range of the second detecting module 103 is employed to detect whether there is any moving object near the rear left position or the rear right position of the car.

The second detection range has a wider detecting angle and a shorter detecting distance when compared with the first detection range. Consequently, the second detection range is sufficient to cover the rear left position or the right left position of the car. Moreover, because of the shorter detecting distance, the second detection range is only allowed to detect the moving object close to the rear of car. Since the farther obstacle is not detected by the second detection range, the possibility of causing the systematic misjudgment will be minimized.

If the first detecting module 102 of the car door opening pre-detection system 10 detects that the palm of the driver is not contacted with the steering wheel or the palm of the driving or passenger is close to or contacted with the door handle, the control module 101 judges that the car door is about to be opened according to the motion detecting signal M1 from the first detecting module 102. Then, the control module 101 further controls the operation of the second detecting module 103. Under this circumstance, the detection range of the second detecting module 103 is switched from the first detection range to the second detection range. The function of the radar detecting module or the lidar detecting module of the second detecting module 103 can be provided by the reversing radar detecting device of the existing car. In other words, it is not necessary to install any other detecting device.

Please refer to FIG. 1 again. In this embodiment, the car door opening pre-detection system 10 further comprises the projecting module 104 and the image pickup module 105. An example of the image pickup module 105 is an optical imaging lens. Moreover, the image pickup module 105 is installed in the interior portion of the car or installed on the exterior portion of the car in order to capture the scene image behind the car. For example, the image pickup module 105 is installed on a rear bumper, a rear view mirror or a rear trunk of the car, or arranged between a rear windshield and a rear seat of the car. The projecting module 104 is also installed in the interior portion of the car or installed on the exterior portion of the car. Moreover, the projecting module 104 is used for projecting the scene image that is captured by the image pickup module 105 or projecting a predetermined warning image. In an embodiment, the projecting module 104 is disposed on a dashboard within the car and used as a head up display. In another embodiment, the projecting module 104 is located at the front seat or the rear seat of the car and near the window of any car door in order to project the image on the window. In a further embodiment, the projecting module 104 is installed on a rear bumper outside the car. The projecting module 104 projects the predetermined warning signal on the road behind the car in order to achieve a warning purpose. An example of the projecting module 104 includes but is not limited to a liquid crystal display (LCD) projecting module, a digital light processor (DLP) projecting module or a laser projecting module.

Figure 2:
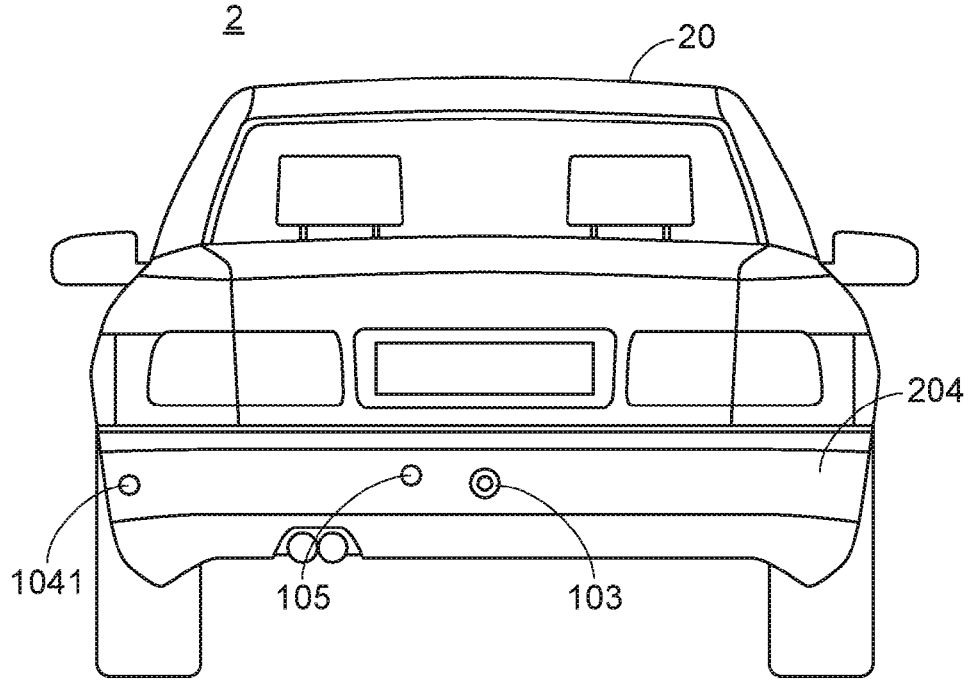
FIG. 2 schematically illustrates a first example of installing a portion of the car door opening pre-detection system according to the present invention.
Figure 3:
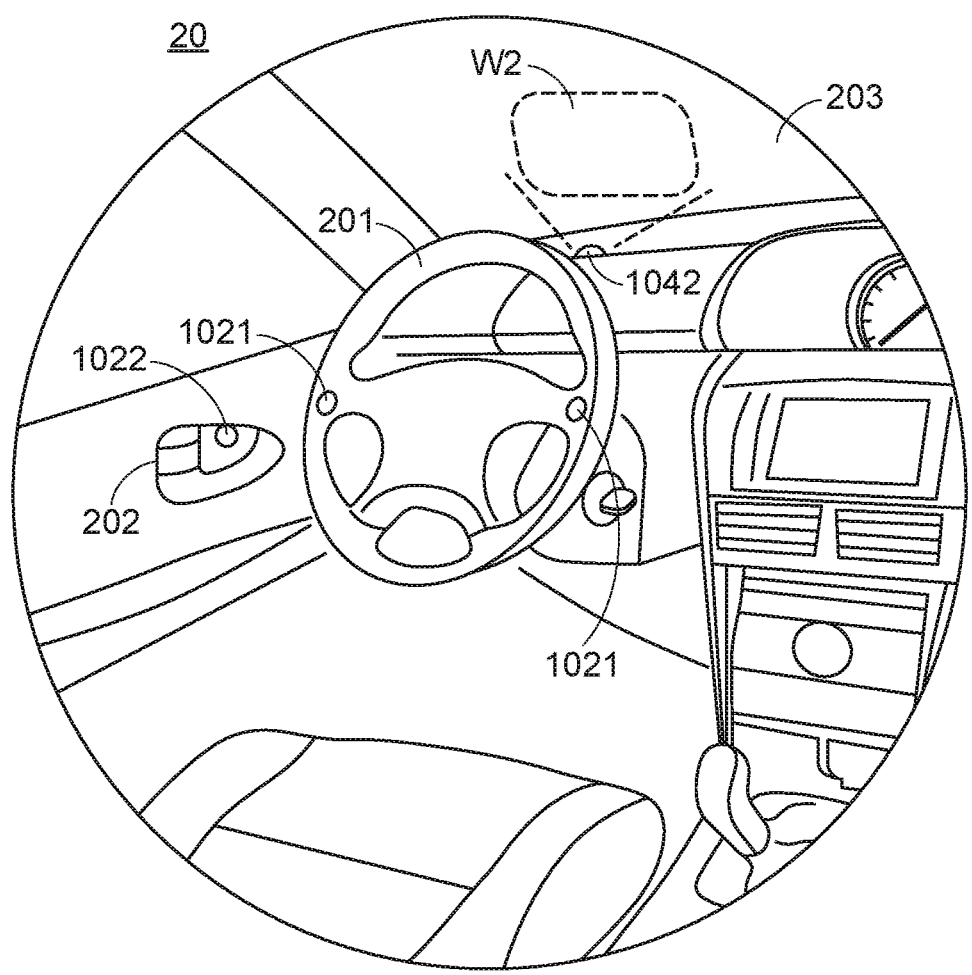
FIG. 3 schematically illustrates a second example of installing a portion of the car door opening pre-detection system according to the present invention.

Please refer to FIGS. 1, 2 and 3. FIG. 2 schematically illustrates a first example of installing a portion of the car door opening pre-detection system according to the present invention. FIG. 3 schematically illustrates a second example of installing a portion of the car door opening pre-detection system according to the present invention. In the rear view of FIG. 2, the car 2 with the car door opening pre-detection system 10 comprises a car body 20. Moreover, the car body 20 comprises a rear bumper 204, and the second detecting module 103 is located at a middle region of the rear bumper 204. The image pickup module 105 is located beside the second detecting module 103. A laser projecting module 1041 is located at an end of the rear bumper 204. The laser projecting module 1041 is used for projecting an image on the road near the rear left position or the rear right position of the car 2 in order to warn the moving object near the rear of the car 2. For example, the moving object is a car, a motorcycle or a pedestrian while moving. Preferably, the projected image is the predetermined warning image.

Please refer to FIG. 3. The interior portion of the car body 20 comprises a steering wheel grip 201, a car handle 202 and a front windshield 203. Moreover, two pneumatic/micro-vibration detecting modules 1021 are located at two ends of the steering wheel grip 201, respectively. Moreover, an infrared detecting module 1022 is located at the car handle 202 for detecting whether the palm of the driver is close to the car handle 202. When the palm of the driver or passenger is close to the door handle and the relative distance is smaller than 2 centimeters, the infrared detecting module 1022 issues the motion detecting signal M1 to the control module 101. After the motion detecting signal M1 from the infrared detecting module 1022 is received, the control module 101 judges that the car door is about to be opened by the driver or passenger. Consequently, the detection range of the second detecting module 103 is switched under control of the control module 101.

Moreover, a digital light processor (DLP) projecting module 1042 is disposed on a dashboard within the car body 20. The DLP projecting module 1042 is used for projecting an image W2 on the front windshield 203 in order to warn the driver that a moving object behind the car 2 is approaching the car 2. The image W2 projected by the DLP projecting module 1042 is the predetermined warning signal or the scene image behind the car 2 that is captured or shot by the image pickup module 105.

In the embodiment of FIG. 3, the pneumatic/microvibration detecting modules 1021 are installed on the steering wheel grip 201, and the infrared detecting module 1022 is installed on the car handle 202. It is noted that the types of the detecting modules are not restricted. That is, any type of the above detecting modules is installed on the steering wheel grip 201, the car handle 202 or the nearby position according to the requirement of detecting the motions of the palm and the hand.

Figure 4A:
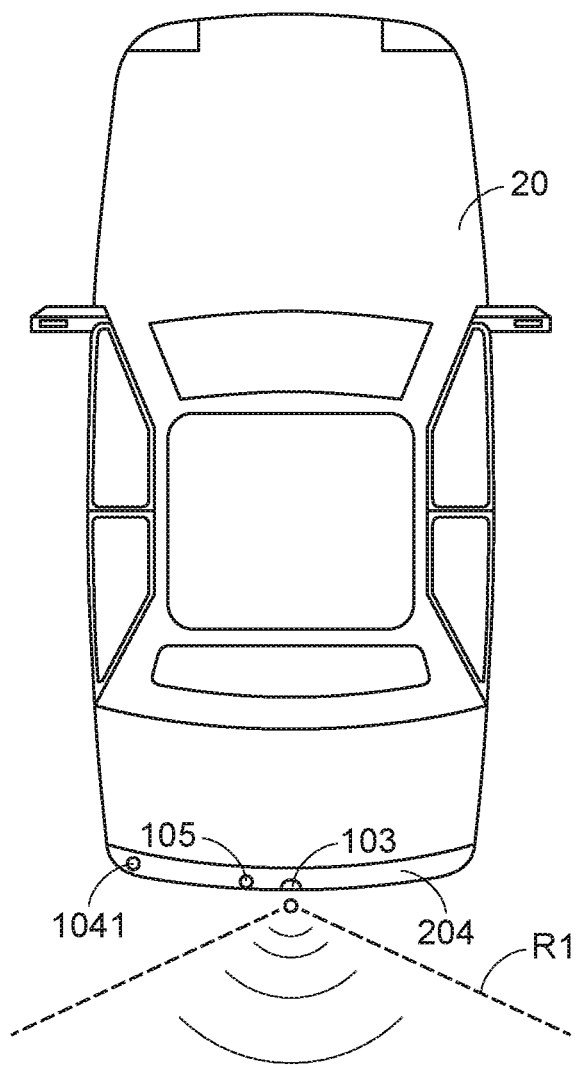
FIG. 4A schematically illustrates the first detection range of the second detecting module of the car according to the present invention.
Figure 4B:
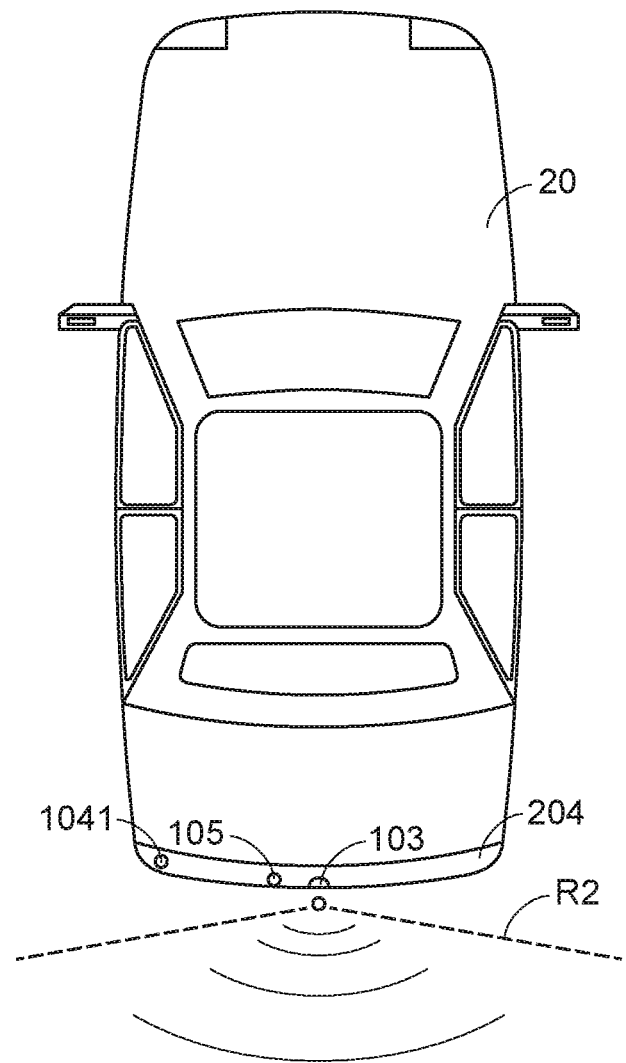
FIG. 4B schematically illustrates the second detection range of the second detecting module of the car according to the present invention.

Please refer to FIGS. 4A and 4B. FIG. 4A schematically illustrates the first detection range of the second detecting module of the car according to the present invention. FIG. 4B schematically illustrates the second detection range of the second detecting module of the car according to the present invention. The functions of the car body 20, the rear bumper 204, the second detecting module 103, the image pickup module 105 and the laser projecting module 1041 of FIGS. 4A and 4B are similar to those of FIG. 2, and are not redundantly described herein. As shown in FIG. 4A, the car is stopped or reversed. In this situation, the second detecting module 103 installed on the rear bumper 204 provides the first detection range R1. In the first detection range R1, the detecting angle is 130 degrees and the detecting distance is between 50 and 100 meters. The first detection range R1 of the second detecting module 103 is employed to detect the farther obstacle behind the car when the car is stopped or reversed. As shown in FIG. 4B, the car is stopped and the car door opening pre-detection system 10 judges that the car door is about to be opened. In this situation, the second detecting module 103 provides the second detection range R2. In the second detection range R2, the detecting angle is 160 degrees and the detecting distance is 5 meters. The second detection range R2 of the second detecting module 103 is employed to detect the moving object near the rear left position or the rear right position of the car when the car is stopped and the car door is about to be opened.

Figure 5:
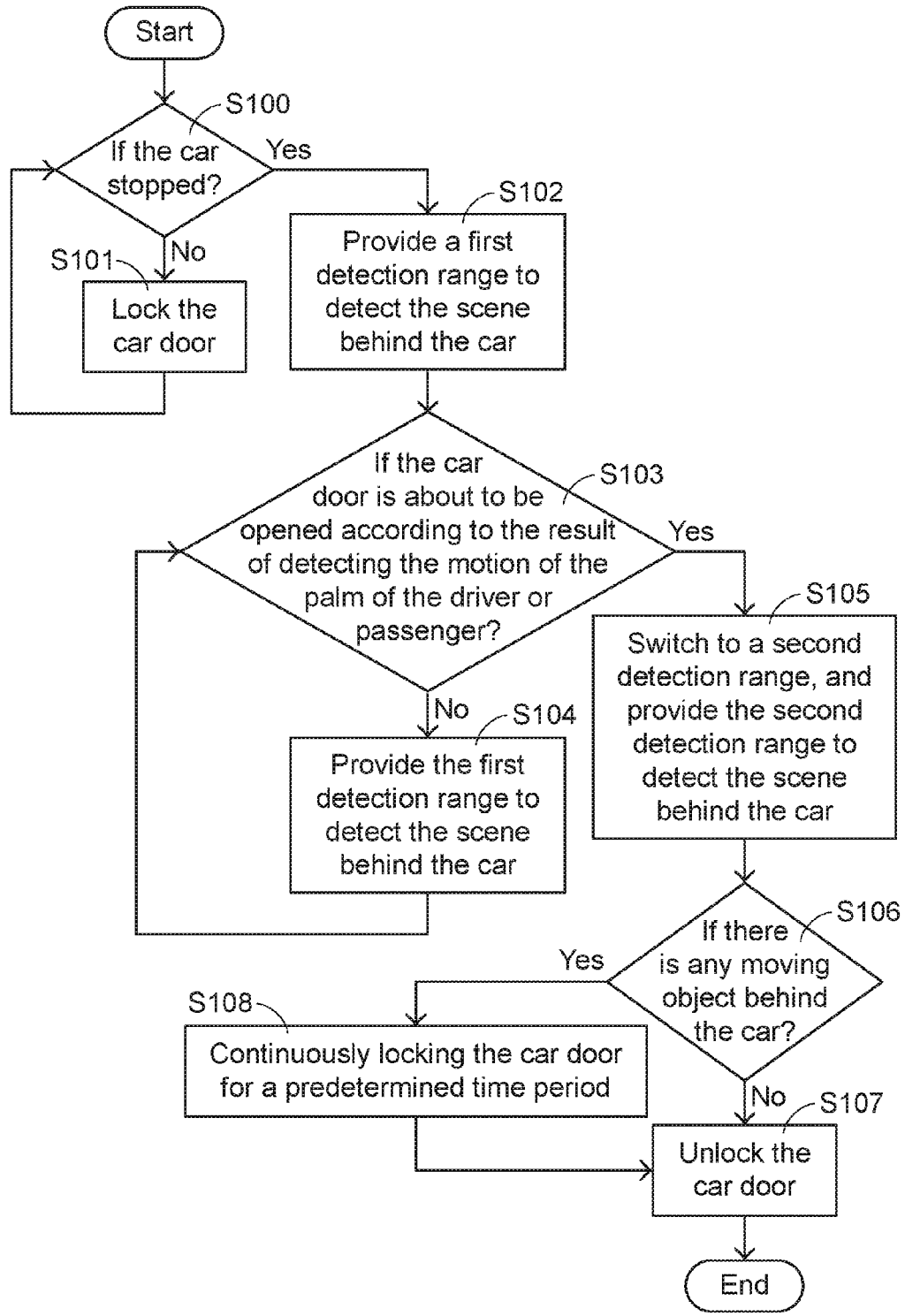
FIG. 5 is a flowchart illustrating an operating method of the car door opening pre-detection system according to the embodiment of the present invention.

Please refer to FIGS. 1 and 5. FIG. 5 is a flowchart illustrating an operating method of the car door opening pre-detection system according to the embodiment of the present invention. After the car is started, a step S100 is performed to judge whether the car is stopped. If the car is not stopped, the car door is locked (Step S101). Since the car door is locked in the step S101, the car door cannot be opened. Then, the step S100 is repeatedly done to continuously detect whether the car is stopped. If the car is stopped, the second detecting module 103 is enabled to provide a first detection range to detect the scene behind the car (Step S102). Then, the first detecting module 102 is enabled to detect the motion of the palm of the driver or passenger to judge whether the car door is about to be opened (Step S103). In the step S103, there are three possible situations of judging whether the car door is about to be opened according to the result of detecting the motion of the palm of the driver or passenger. In the first situation, the palm of the driver is moved from the steering wheel. In the second situation, the palm of the driver is moved from the steering wheel and close to or contacted with the door handle. In the third situation, the palm of the driver or passenger is close to or contacted with the door handle. If the above situations are not detected, the judging condition of the step S103 is not satisfied. Then, the second detecting module 103 continuously provides the first detection range to detect the scene behind the car (Step S104), and the step S103 is repeatedly done. If one of the above situations is detected, the judging condition of the step S103 is satisfied. Then, the first detection range is switched to a second detection range, and the second detecting module 103 provides the second detection range to detect the scene behind the car (Step S105). Then, a step S106 is performed to detect whether there is any moving object behind the car. If the judging condition of the step S106 is not satisfied, the car door is unlocked (Step S107) and the car door opening pre-detection system is disabled. Whereas, if the judging condition of the step S106 is satisfied, the car door is continuously locked for a predetermined time period (Step S108). In the step S108, the predetermined time period is in the range between 20 seconds and 200 seconds. The predetermined time period is set by the system user according to the driving safety demand and the car opening habits of the driver and the passengers.

During the time period of continuously locking the car door, the driver or passenger cannot open the car door. At the same time, the projecting module 104 within the car projects the predetermined warning image on any car door or the front windshield to warn the driver or passenger. Moreover, the projecting module 104 within the car projects the scene image behind the car that is captured by the image pickup module 105. Consequently, the driver or passenger can realize the motion of the moving object. In case that the projecting module 104 is installed on the exterior portion of the car, the projecting module 104 projects the predetermined warning signal on the road near the rear left position or the rear right position of the car in order to warn the moving objects that are close to the rear of the car. For example, the moving objects close to the rear of the car are other cars or pedestrians. Since other cars or pedestrians realize that the car door of the front car is about to be opened, they will slow down the driving speeds or walking speeds.

After the car door has been continuously locked for the predetermined time period (Step S108), the step S107 is performed. Since the car door is unlocked, the driver or passenger can open the door and get out of the car.

Figure 6:
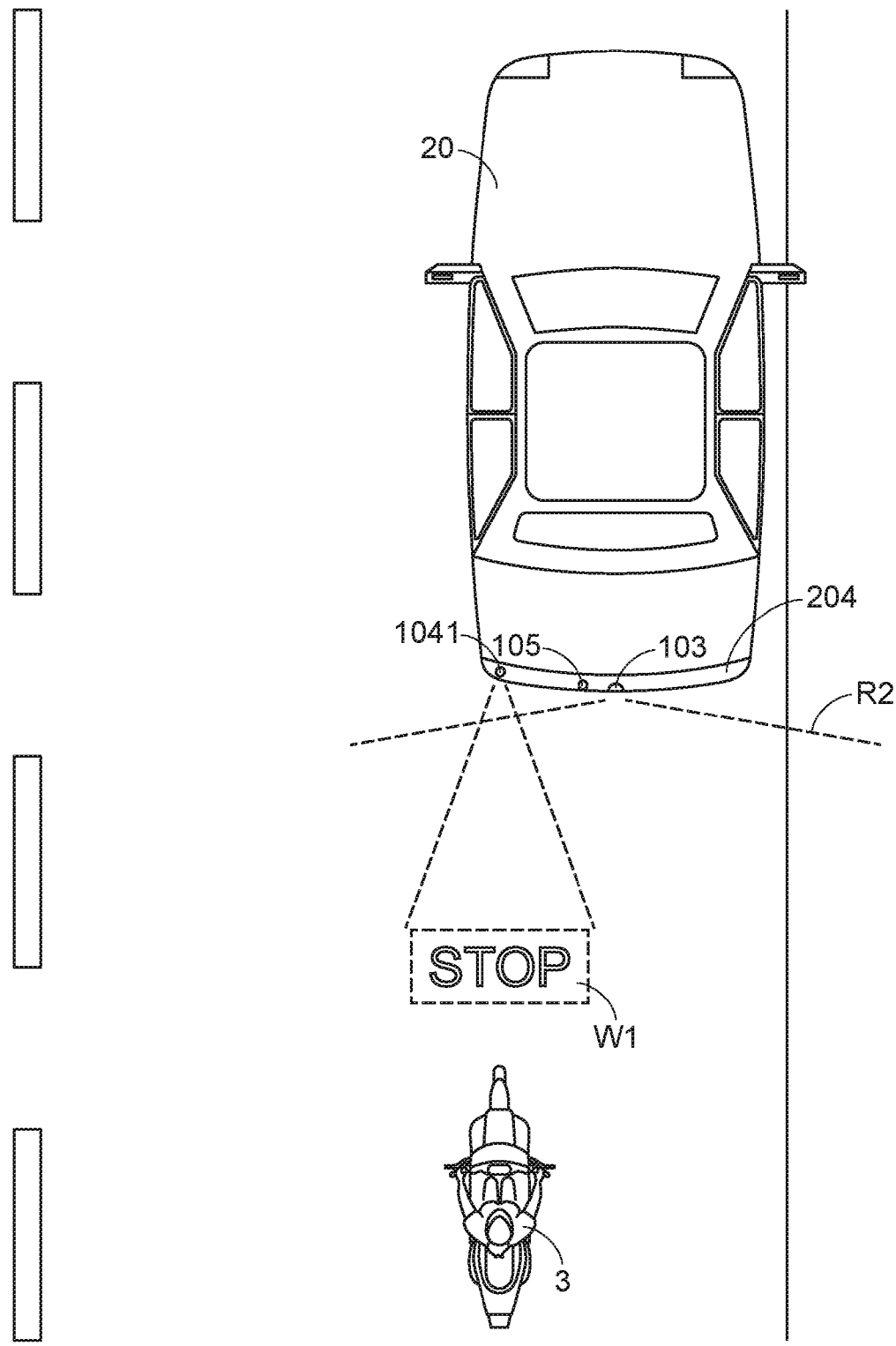
FIG. 6 schematically illustrates a usage scenario of the car door opening pre-detection system according to the embodiment of the present invention.

FIG. 6 schematically illustrates a usage scenario of the car door opening pre-detection system according to the embodiment of the present invention. The functions of the car body 20, the rear bumper 204, the second detecting module 103, the image pickup module 105 and the laser projecting module 1041 of FIG. 6 are similar to those of FIG. 2, and are not redundantly described herein. As shown in FIG. 6, the car 2 is stopped on the shoulder, and the driver or passenger is about to open the car door. Under this circumstance, the first detection range R1 is switched to the second detection range R2, and the second detecting module 103 provides the second detection range R2 to detect the scene behind the car 2. While the second detecting module 103 provides the second detection range R2, the second detecting module 103 detects that a motorcycle rider 3 (i.e., a moving object) is close to the rear left position of the car 2. Meanwhile, the car door of the car 2 is locked, and thus the car door cannot be opened. In addition, the laser projecting module 1041 projects the predetermined warning image W1 (e.g., a mark "STOP") on the road in front of the motorcycle rider 3. According to the predetermined warning image W1, the motorcycle rider 3 realizes that the car door is about to be opened by the driver or passenger of the car 2. Consequently, the motorcycle rider 3 may slow down the motorcycle or bypass the car 2 to another track of the road and continuously drive.

From the above descriptions, the present invention provides a car door opening pre-detection system. By the car door opening pre-detection system of the present invention, the driver or passenger can pre-detect the traffic condition behind the car and immediate control the opened or locked state of the car door before the car door is opened. Moreover, according to the warning signal or the scene image behind the car, the car door opening pre-detection system realizes that a moving object behind the car is approaching. Consequently, while the driver or passenger opens the door, the problem of causing the collision accidents because of not noticing the rear-side cars can be effectively avoided. Moreover, since the function of the second detecting module can be provided by the reversing radar detecting device of the existing car, it is not necessary to install any other detecting device on the exterior portion of the car. Since the installation cost of the car door opening pre-detection system is largely reduced, the car door opening pre-detection system is favored by many people. In other words, the car door opening pre-detection system is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A car door opening pre-detection system for a car, the car door opening pre-detection system comprising:
    a first detecting module installed in an interior portion of the car, wherein the first detecting module issues a motion detecting signal according to a result of detecting a motion of a palm;
    a second detecting module installed on an exterior portion of the car, wherein when the car is stopped, the second detecting module is enabled to selectively provide a first detection range or a second detection range; and
    a control module electrically connected with the first detecting module and the second detecting module, wherein the control unit receives the motion detecting signal and judges whether a car door of the car is about to be opened according to the motion detecting signal,
    wherein when the car is stopped and the control module judges that the car door is about to be opened, the first detection range of the second detecting module is switched to the second detection range under control of the control module, and the second detecting module provides the second detection range to detect whether a moving object behind the car is close to the car within the second detection area,
    wherein the second detection range has a larger detecting angle than the first detection range and a smaller detecting distance than the first detection range.

2. The car door opening pre-detection system according to claim 1, wherein the first detecting module is an optical detecting module or a pneumatic/micro-vibration detecting module.

3. The car door opening pre-detection system according to claim 1, wherein the first detecting module is installed on a steering wheel of the car or installed on a door handle in the interior portion of the car.

4. The car door opening pre-detection system according to claim 3, wherein if the first detecting module detects that a distance between the palm and the door handle is within a predetermined distance, the control 18 module judges that the car door is about to be opened.

5. The car door opening pre-detection system according to claim 4, wherein the predetermined distance is 2 centimeters.

6. The car door opening pre-detection system according to claim 3, wherein if the first detecting module detects that door handle is touched by the palm, the control module judges that the car door is about to be opened.

7. The car door opening pre-detection system according to claim 1, wherein the second detecting module is a radar detecting module or a lidar detecting module.

8. The car door opening pre-detection system according to claim 1, wherein when the second detecting module provides the first detection range, a detecting angle is 130 degrees and a detecting distance is between 50 and 100 meters.

9. The car door opening pre-detection system according to claim 1, wherein when the second detecting module provides the second detection range, a detecting angle is 160 degrees and a detecting distance is 5 meters.

10. The car door opening pre-detection system according to claim 1, further comprising a projecting module, wherein the projecting module is electrically connected with the control module and projects an image.

11. The car door opening pre-detection system according to claim 10, wherein the projecting module is installed on the exterior portion of the car, and the projecting module projects the image on a road behind the car, wherein the image is a warning signal.

12. The car door opening pre-detection system according to claim 10, wherein the projecting module is installed on the interior portion of the car, and the projecting module projects the image on any door window of the car, wherein the image is a warning signal.

13. The car door opening pre-detection system according to claim 12, further comprising an image pickup module, wherein the image pickup module is electrically connected with the control module, and the image pickup module captures a scene image behind the car, wherein the scene image is projected on any door window of the car through the projecting module.

14. The car door opening pre-detection system according to claim 1, wherein if the second detecting module provides the second detection range and the moving object is detected by the second detecting module, the control module locks the car door for a predetermined time period.

15. The car door opening pre-detection system according to claim 14, wherein the predetermined time period is between 20 seconds and 200 seconds.

* * * * *